United States Patent
Davis et al.

(10) Patent No.: US 6,393,167 B1
(45) Date of Patent: *May 21, 2002

(54) FAST, ENVIRONMENTALLY-STABLE FIBER SWITCHES USING A SAGNAC INTERFEROMETER

(76) Inventors: Monica K. Davis, 227 W. William St., Corning, NY (US) 14830; Michel J. F. Digonnet, 2307 Harvard St., Palo Alto, CA (US) 94306

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/215,403

(22) Filed: Dec. 18, 1998

Related U.S. Application Data
(60) Provisional application No. 60/094,851, filed on Jul. 31, 1998, and provisional application No. 60/095,358, filed on Aug. 5, 1998.

(51) Int. Cl.[7] .............................. G02B 6/26; G02B 6/00
(52) U.S. Cl. ................................ 385/5; 385/16; 385/32; 385/122
(58) Field of Search .............................. 385/5, 16, 32, 385/31, 122

(56) References Cited

U.S. PATENT DOCUMENTS

| | | | | |
|---|---|---|---|---|
| 4,962,987 A | * | 10/1990 | Doran | 359/108 |
| 4,973,122 A | * | 11/1990 | Cotter et al. | 385/50 |
| 5,144,375 A | * | 9/1992 | Gabriel et al. | 385/16 |
| 5,301,008 A | * | 4/1994 | Huang et al. | 385/16 |
| 5,493,433 A | * | 2/1996 | Prucnal et al. | 359/123 |
| 5,526,175 A | * | 6/1996 | Minelly et al. | 385/5 |
| 5,604,618 A | * | 2/1997 | Mori et al. | 359/127 |
| 5,687,260 A | * | 11/1997 | Liedenbaum | 385/16 |
| 5,760,948 A | * | 6/1998 | Bigo | 385/5 |
| 5,917,979 A | * | 6/1999 | Prucnal | 385/122 |

OTHER PUBLICATIONS

B.K. Nayar, et al., All–optical switching in a 200–m twin–core fiber nonlinear Mach–Zehnder interferometer, *Optics Letters*, vol. 16, No. 6, Jan. 4, 1991, pp. 408–410.

(List continued on next page.)

*Primary Examiner*—Rodney Bovernick
*Assistant Examiner*—Juliana K. Kang
(74) *Attorney, Agent, or Firm*—Knobbe, Martens, Olson & Bear, LLP

(57) ABSTRACT

A fast, environmentally-stable fiber switch uses a Sagnac interferometer having an active fiber portion located asymmetrically in the loop of the interferometer. A pump pulse is applied to the interferometric loop and acts upon the active fiber portion to cause a change in its refractive index either by a thermal effect or by a non-thermal nonlinear effect. Because the active fiber portion is located asymmetrically in the loop, the change in refractive index of the active fiber portion is seen by the clockwise propagating light signal and the counterclockwise propagating light signal at different times, thus causing a temporary difference in the phase changes experienced by the two counterpropagating light signals. The temporary difference in the phase changes causes the two light signals to combine constructively at a switched output port of the input/output coupler of the interferometric loop until the phase changes of the two signals are again the same, at which time the signals combine at an unswitched output port of the coupler. The on-time of the switch is set primarily by the length of the Sagnac loop, and the fall time, which is caused by the Sagnac architecture, can be fast, even with a relatively slow active fiber.

29 Claims, 7 Drawing Sheets

OTHER PUBLICATIONS

N.J. Doran, et al., Experimental Investigation of All–Optical Switching in Fibre Loop Mirror Device, *Electronics Letters*, vol. 25, No. 4, Feb. 16, 1989, pp. 267–269.

M.C. Farries, et al., Optical fiber switch employing a Sagnac interferometer, *Applied Physics Letters*, vol. 55, No. 1, Jul. 3, 1989, pp. 25–26.

M. Jinno, et al., Demonstration of Laser–diode–pumped ultrafast all–optical switching in a nonlinear Sagnac interferometer, *Electronics Letters*, vol. 27, No. 1, Jan. 3, 1991, pp. 75–76.

R.W. Keys, et al., Polarization–Dependant Gain in Erbium–Doped Fibers, Proceedings of the Optical Fiber Communication Conference OSA Technical Digest Series No. 4, 1994, pp. 306–307.

D.W. Garvey, et al., Characterization of the Switching Properties of a Singlemode Polymer Optical Fiber, *SPIE*, vol. 2527, 1995, pp. 404–410.

M.K. Davis, et al., Characterization of Clusters in Rare Earth–Doped Fibers by Transmission Measurements, *Journal of Lightwave Technology*, vol. 13, No. 2, Feb. 1995, pp. 120–126.

J.W. Arkwright, et al., An investigation of Q–switched induced quenching of the resonant nonliearity in neodymium doped fibers, *Journal of Lightwave Technology*, vol. 14, No. 1, Jan. 1996, pp. 110–120

M. Asobe, Low power all–optical switching in an nonlinear optical loop mirror using chalcogenide glass fibre, *Electronics Letters*, vol. 32, No. 15, Jul. 18, 1996, pp. 1396–1397.

R. M. Ribeiro, et al., Switching in all–fibre interferometer using a semiconductor coated D–fibre, *Electronics Letters*, vol. 32, No. 15, Jul. 18, 1996, pp. 1402–1403.

M.J.F. Digonnet, et al., Resonantly Enhanced Nonlinearity in Doped Fibers for Low–Power All–Optical Switching: A Review, *Optical Fiber Technology*, vol. 3, No. 1, 1997, pp. 44–64.

M.K. Davis, et al., Thermal Effects in Doped Fibers, *Journal of Lightwave Technology*, vol. 16, No. 6, Jun. 1998, pp. 1013–1023.

* cited by examiner

FAST, ENVIRONMENTALLY-STABLE FIBER SWITCHES USING A SAGNAC INTERFEROMETER

RELATED APPLICATIONS

The present application claims the benefit of priority under 35 U.S.C. § 119(e) of U.S. Provisional Patent Application No. 60/094,851 filed on Jul. 31, 1998, and U.S. Provisional Patent Application No. 60/095,358 filed on Aug. 5, 1998.

BACKGROUND OF THE INVENTION

1. Field of the Invention

The present invention is directed to a new architecture for an all-optical fiber or waveguide switch based on a fiber Sagnac interferometer.

2. Description of the Related Art

In an all-optical waveguide switch, a light signal is switched from one output port to another by the application of either another optical signal of different wavelength (pump-induced switching) or by the light signal itself (self-switching). This is typically accomplished in an optical interferometer by placing an element possessing an optical third-order nonlinearity in one of the two arms of the interferometer. For example, in the case of pump-induced switching, in the absence of pump light, the interferometer is adjusted (or fabricated) such that all the signal power comes out of one of the two output ports of the interferometer. When the pump light is applied, it modifies the index of refraction of the nonlinear element, and thus the phase of the signal traveling in this arm. When the phase shift has the right value (which depends on the interferometer, but which is, as an example, $\pi$ in a Mach-Zehnder interferometer), the signal is switched from one port to the other.

Because third-order nonlinear effects are generally weak, they tend to require relatively high intensities and/or long nonlinear media to produce this kind of large phase shift. The switching is then characterized by a high intensity-length product. Thus, an optical fiber which preserves a high optical intensity over very long lengths (kilometers) can produce a large phase shift at low optical powers. In fibers, however, only a few types of third-order nonlinearities are available. The most commonly used type is the Kerr effect. The Kerr effect is, however, notoriously weak in silica fibers. To make a Kerr-based switch in a silica fiber requires either a long fiber and a relatively low switching power, or a high power and a short fiber (or waveguide). In the former situation, the fiber arm needs to be so long that most interferometers are unstable and impractical. This is particularly true of the commonly-used Mach-Zehnder interferometer, which needs to be in the sub-centimeter length range for its bias point to be stable over reasonable fiber temperature changes. In the latter situation, the fiber can be short and thus the interferometer can be more stable, but the power required to switch is too high. A high switching power is detrimental because it leads to breakdown of the fiber, because it is expensive, or both.

Other materials and other types of nonlinearity are much stronger than the Kerr effect in silica, and thus require smaller intensity-length products. One particular example is so-called resonantly enhanced nonlinearities, which occur in materials and/or dopants that possess suitable electronic transitions. Examples include semiconductors, such as $CdSe_xS_{1-x}$, or GaAs, and chalcogenide glasses. (See, M. Asobe, Low power all-optical switching in a nonlinear optical loop mirror using chalcogenide glass fibre, *ELECTRONICS LETTERS*, Jul. 18, 1996, Vol. 32, No. 15, pp. 1396–1397.) A resonantly enhanced nonlinearity can also be observed in dopants that can be introduced into a silica fiber, for example, a trivalent rare earth like erbium ($Er^{3+}$) or neodymium ($Nd^{3+}$). (See, M. J. F. Digonnet, et al., Resonantly Enhanced Nonlinearity in Doped Fibers for Low-Power All-Optical Switching: A Review, *OPTICAL FIBER TECHNOLOGY* Vol. 3, 1997, pp. 44–64.) The advantage of the latter type of nonlinearity is that one can still utilize a silica-based fiber, i.e., retain all the basic low-loss, low-dispersion properties of the silica fiber, which may be eventually beneficial to produce a low-loss, ultrafast switch. However, with existing resonantly enhanced nonlinear materials, if one wishes to keep the switching power low, the length required for the nonlinear element is still too long for most interferometers to be stable.

In summary, the search for a suitable all-optical switch is strongly connected to (1) the development of materials with strong third-order nonlinearities, and to (2) the identification of a switch architecture that can be stable even with long lengths of fiber in its arms.

The Sagnac fiber loop was recognized years ago as a potential solution to this last problem. The primary reason is that unlike most interferometers, the Sagnac loop is a true commonpath interferometer, which means that it is reciprocal. Therefore, even with very long loop lengths, the Sagnac loop is extremely stable to slow external perturbations (slow being defined on the scale of the time it takes light to propagate around the Sagnac loop). Thus, it is possible to utilize a very long Sagnac loop of silica fiber (up to kilometers) and obtain, via the Kerr effect of the fiber, a sizeable phase shift with a low switching power.

The Sagnac interferometer has been used in several ways to demonstrate all-optical switching. The most common approach utilizes the Kerr effect of the silica fiber and an effect known as cross-phase modulation. (See, N. J. Doran, et al., Experimental Investigation of All-Optical Switching in Fibre Loop Mirror Device, *ELECTRONICS LETTERS*, Vol. 25, No. 4, Feb. 18, 1989, pp. 267–269; and M. C. Farries, et al., Optical fiber switch employing a Sagnac interferometer, *APPLIED PHYSICS LETTERS*, Vol. 55, No. 1, Jul. 3, 1989, pp. 25–26.) In this scheme, the pump pulse that causes the switching propagates only in one direction of the loop, and the pump pulse is much shorter than the loop length. The signal traveling in the loop in the same direction as the pump (copropagating) sees the pump during its entire passage through the loop, while the signal traveling in the other direction as the pump (counterpropagating) sees the pump only during the brief time they happen to be at the same location in the loop. Since the Kerr effect is extremely fast (femtoseconds), for pump pulses 100 femtoseconds or longer (which covers most experimental situations), the counterpropagating signal experiences a nonlinear index change over a very short fraction of the loop length. On the other hand, the copropagating signal experiences a nonlinear index change over the entire loop length (assuming negligible walk-off). Thus, the two signals experience a differential phase shift. When the pump power is such that this differential phase shift is equal to $\pi$, the signal has been fully switched from one port to the other.

A self-switching application of the Kerr effect in a Sagnac loop utilizes the fact that if the two signals counterpropagating in the loop have different powers, which can be induced by adjusting the coupling ratio of the Sagnac loop coupler away from 50%, then one signal will experience a larger Kerr phase shift than the other. (See, N. J. Doran, et al., cited above.) By adjusting the signal power, this power imbalance can be such that the differential phase shift between the counterpropagating signals is $\pi$, and again the signal is fully switched.

Another embodiment utilizes the Kerr effect again but counterpropagating signals with orthogonal polarizations in the Sagnac loop. (See, M. Jinno, et al., Demonstration of laser-diode-pumped ultrafast all-optical switching in a nonlinear Sagnac interferometer, *ELECTRONICS LETTERS*, Vol. 27, No. 1, Jan. 3, 1991, pp. 75–76.) The loop is made of polarization-maintaining fiber to ensure. that the polarizations of the two optical signals and the pump remain the same relative to each other along the entire loop. The signal with a polarization parallel to the pump polarization then experiences a larger phase shift than the signal with a polarization orthogonal to the pump polarization. Again, by adjusting the pump power to. a suitable level, this differential phase shift can be made equal to $\pi$, and the signal is fully switched. This effect was also demonstrated using a dye-doped polymer fiber as the nonlinear element. (See, D. W. Garvey, et al., Characterization of the Switching Properties of a Singlemode Polymer Optical Fiber, *SPIE*, Vol. 2527, 1995, pp. 404–410.)

Another demonstration uses a chalcogenide fiber as the nonlinear element, which is inserted in a Sagnac loop made of a silica fiber. (See, M. Asobe, et al., cited above.) The use of the chalcogenide fiber, which has a much stronger Kerr effect than silica, enables the use of a shorter fiber and/or a lower switching power.

In another embodiment, a fiber Sagnac switch was demonstrated in which the nonlinear element was a D-shaped fiber coated with $\alpha$-silicon, a semiconductor that acts as a nonlinear material. (See, R. M. Ribeiro, et al., Switching in all-fibre interferometer using a semiconductor coated D-fibre, *ELECTRONICS LETTERS*, Vol. 32, No. 15, Jul. 18, 1996, pp. 1402–1403.) The D-shaped fiber was placed asymmetrically in the Sagnac loop, close to the coupler. Because of this asymmetry, the signal that arrives at the nonlinear element first experiences a certain phase shift. If the nonlinear response of the nonlinear element is much shorter than the loop transit time, and if the pump is turned off by the time the counterpropagating signal arrives at the nonlinear element, then the counterpropagating signal, which arrives later, will experience a nonlinear phase shift that is lower (ideally zero) than the phase shift experienced by the first signal.

All of the Sagnac loop switches reported to date, however, still utilize relatively long lengths of fiber—generally tens of centimeters or more. They also require very fast nonlinear media.

SUMMARY OF THE INVENTION

It is the purpose of this invention to provide a Sagnac interferometer which can be used with relatively slow nonlinear media, as well as with media in which the pump-induced index change occurs via a thermal effect. The present invention is particularly attractive to produce switches that need to remain "on" for relatively long times (from -nanoseconds to microseconds). Unlike other Sagnac switches, the "on" time can be conveniently adjusted by changing the length of the Sagnac loop.

The Sagnac switch architecture in accordance with the present invention is stable against slow environmental perturbations such as temperature changes for any length of waveguide, even for very long waveguides. This property of the present invention makes it possible to use longer waveguides of any length, provided the active (e.g., doped) portion of the waveguide changes its index of refraction very rapidly in response to the initiation of pumping and the active portion of the waveguide returns to its original index of refraction very slowly after the pumping ceases. The present invention uses the delay in a Sagnac loop to cause the switching off and to control the on time of the switch.

One aspect of the present invention is an apparatus for providing all-optical switching of an optical signal. The apparatus includes an input waveguide which receives an input optical signal. A loop of optical waveguide has an active portion located asymmetrically in the loop. A coupler couples light from the input waveguide to the loop to cause the optical signal to propagate in the loop as first and second counterpropagating signals. The coupler also couples the first and second counterpropagating signals from the loop as a combined output signal. The coupler has first and second output ports. The coupler couples the combined output signal to the first output port when the first and second counterpropagating signals coupled from the loop have a first phase relationship. The coupler couples the combined output signal to the second output port when the first and second counterpropagating signals coupled from the loop have a second phase relationship. A source of pump light is coupled to the loop to introduce pump light to the active portion of the loop. The active portion of the loop is located asymmetrically in the loop. The active portion of the loop is made of a material which has an index of refraction that is intensity dependent. When pump light of suitable wavelength is launched into the active portion, the pump light causes an index change which causes phase changes in the first and second counterpropagating signals. The phase changes cause the first and second signals coupled from the loop to switch from the first phase relationship to the second phase relationship for a time duration proportional to a propagation time through the loop, after which the first and second signals coupled from the loop return to the first phase relationship.

Another aspect of the present invention is a method for switching an optical signal using an optical pump. An optical signal is input into a loop as first and second counterpropagating signals. An active portion of the loop is pumped with the optical pump. The active portion is located asymmetrically in the loop. The pump causes the active portion of the loop to modify the phases of the first and second counterpropagating signals. The location of the active portion in the loop causes the first counterpropagating signal to exit the loop with a modified phase before the second counterpropagating signal exits the loop with the modified phase. The method further includes the step of interfering the first counterpropagating signal with the second counterpropagating signal at a coupler having first and second output ports to generate an output signal. The output signal is output from the second port of the coupler when only one of the counterpropagating signals at the coupler has the modified phase. The output signal is output from the first port of the coupler when neither of the counterpropagating signals at the coupler has the modified phase or when both of the counterpropagating signals at the coupler have the modified phase.

Another aspect of the present invention is a method of using a Sagnac interferometric loop as an optical switch. An input optical signal is provided to a first port of the interferometric loop to cause two portions of the input optical signal to counterpropagate in the interferometric loop. A pump signal is selectively coupled to an asymmetrically located active portion of the loop. The pump signal causes the active portion of the loop to change propagation characteristics. Signal light is output from the interferometric loop. The signal light results from combining the two portions of the input optical signal counterpropagating in the interferometric loop. The signal light is output from the first port before the pump signal is coupled to the active portion of the interferometric loop, The signal light is output from a second port of the interferometric loop when only one of the two portions of the input optical signal has passed through the active portion of the interferometric loop. The signal light is again output from the first port of the interferometric loop when both portions of the input optical signal have passed through the active portion of the interferometric loop.

BRIEF DESCRIPTION OF THE DRAWINGS

The present invention will be described below in connection with the attached drawing figures, in which.

DETAILED DESCRIPTION OF THE PREFERRED EMBODIMENT

The present invention relates to all-optical fiber and waveguide switches, which have potential applications in optical communications and optical sensor arrays. Although described below with respect to components formed using optical fiber, it should be understood that the present invention can be implemented with other types or forms of optical waveguides, such as, for example, integrated optic waveguides fabricated on a planar substrate using materials such as lithium niobate, glasses, semiconductors, polymers, and the like.

Figure 1A:
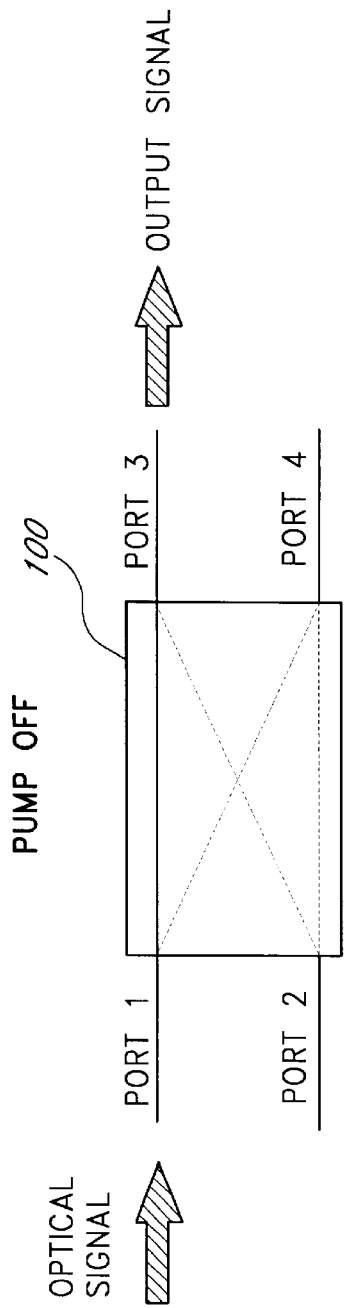
FIGS. 1A and 1B illustrate the operation of a generic switch which switches an input optical signal between two output ports in response to an optical pump signal.
Figure 1B:
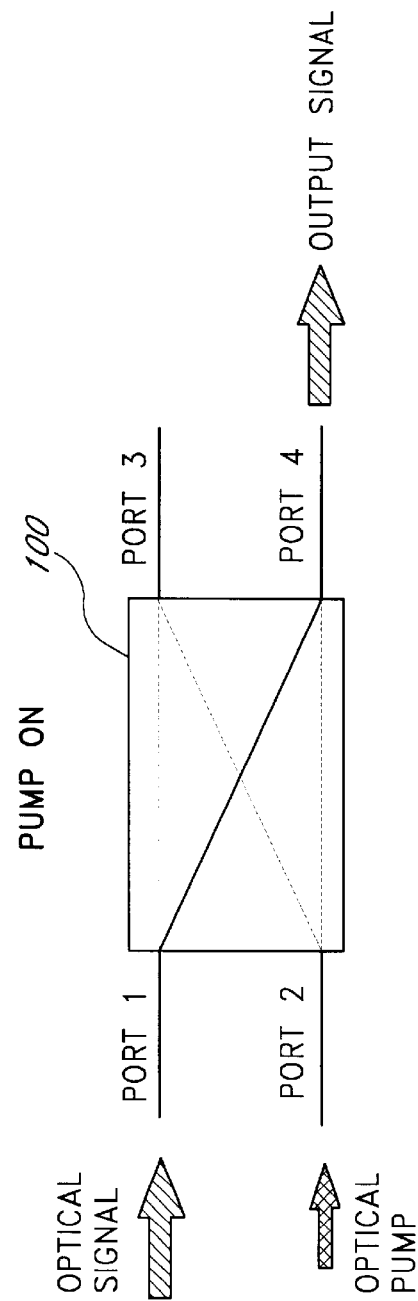

Typically, a fiber switch has two input ports and two output ports. This is illustrated in FIGS. 1A and 1B, where the box 100 represents a generic switch having first and second input ports (port 1 and port 2) and having first and second output ports (port 3 and port 4). In one common protocol, an optical signal applied to one of the input ports (e.g., port 1) emerges at one of the output ports (e.g., port 3). As illustrated in FIG. 1B, when an optical pump pulse of suitable power is launched into the other input port (e.g., port 2), the signal is switched to the second output port (e.g., port 4). When the pump is turned off, the signal returns to the first output port.

Figure 2:
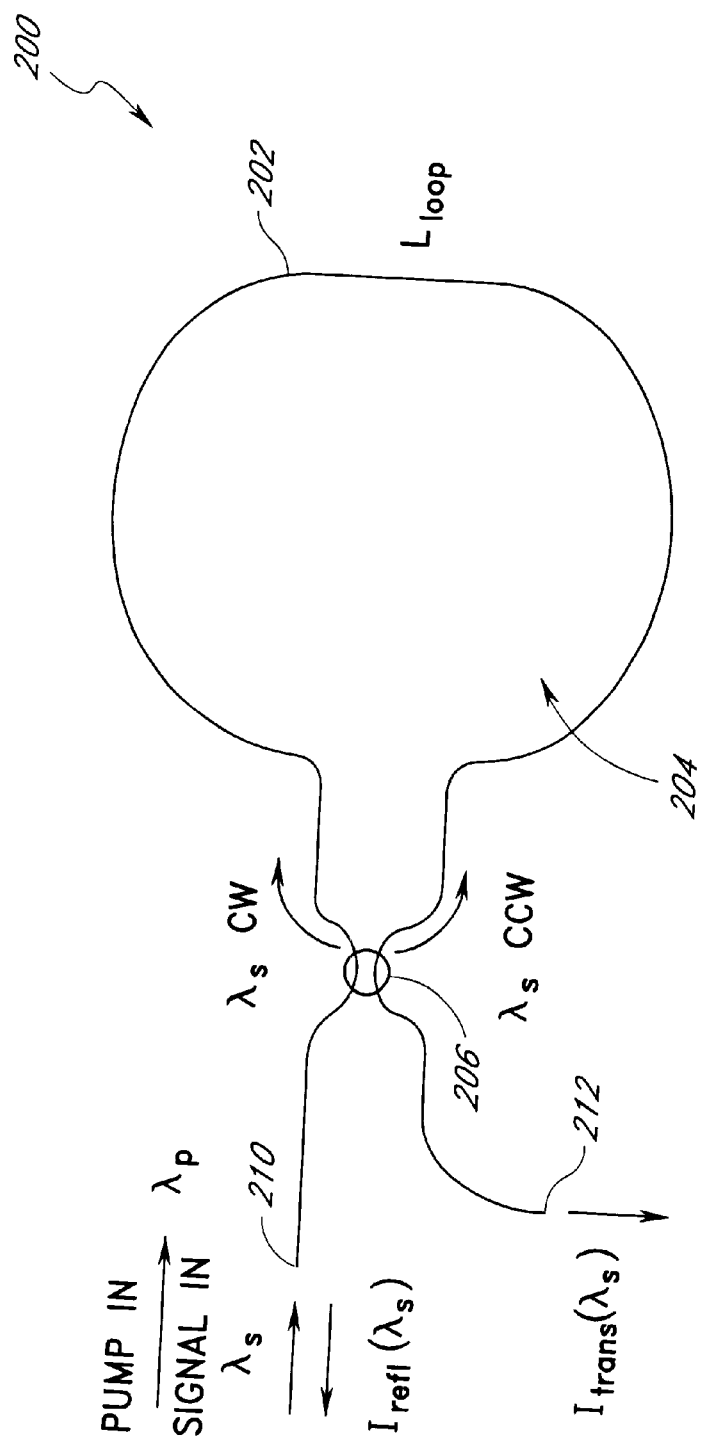
FIG. 2 illustrates an exemplary Sagnac interferometer operating as an all-optical switch using the Kerr effect.

In general, the box 100 of FIGS. 1A and 1B is implemented by an interferometer. For example, FIG. 2 illustrates an exemplary Sagnac interferometer 200 which utilizes the Kerr effect to accomplish the switching. The interferometer comprises an optical fiber 202 formed into a loop 204 by a coupler 206. The coupler is advantageously a 50% coupler at a signal wavelength $\lambda_s$ and is either a 100% coupler or a 0% coupler at a pump wavelength $\lambda_p$. Thus, signal light at the signal wavelength $\lambda_s$ applied to an input end 210 of the fiber 202 is split substantially equally by the coupler 206 to cause a first half of the signal to enter the loop 204 and to propagate around the loop 204 in a clockwise (CW) direction and to cause a second half of the signal to enter the loop 204 and to propagate around the loop 204 in a counterclockwise (CCW) direction. The two signals constructively recombine at the coupler 206, and the combined signal is output from the coupler at either the input end 210 of the fiber 202 or at an output end 212 of the fiber 202 in accordance with the relative phases of the two combined signals. In the absence of a non-reciprocal perturbation of the signals, the two signals will not encounter any relative phase shift, and the combined light is output from the input end 210.

A pump pulse applied to the input end 210 at the pump wavelength $\lambda_p$ enters the coupler 206, but is not split. Rather, if the coupler 206 is a 0% coupler at the pump wavelength, substantially all the pump pulse enters the loop 204 and propagates around the loop 204 in the clockwise direction. On the other hand, if the coupler is a 100% coupler, substantially all the pump pulse enters the loop 204 and propagates around the loop 204 in the counterclockwise direction. For the purpose of the following discussion, the coupler 206 will be considered a 0% coupler at the pump wavelength such that the pump pulse propagates around the loop 204 in the clockwise direction. Thus, the pump pulse copropagates with respect to the clockwise propagating signal portion and counterpropagates with respect to the counterclockwise propagating signal portion.

Assuming the pump pulse is applied to the loop 204 as a short pulse compared to the loop delay $\tau_L$ (e.g., a pulse having a duration of approximately 15 nanoseconds and a loop having a length of 10 meters), the pump pulse will propagate around the loop 204 in the clockwise direction causing a perturbation of the index of refraction of the optical fiber 202. The perturbation of the index of refraction travels around the loop 204 in the clockwise direction in response to the propagation of the pump pulse. Thus, a portion of the signal propagating in the clockwise direction at the same time as the pump pulse will see a change in the index of refraction as it propagates around the loop 204. On the other hand, the corresponding portion of the signal propagating in the counterclockwise direction will only experience a change in the index of refraction for a very short duration as it meets the pump pulse propagating in the opposite direction. Thus, the clockwise propagating signal and the counterpropagating signal will experience nonreciprocal phase shifts (the effects of different propagation velocities of the pump at one wavelength and the signal at a different wavelength can be ignored for the purpose of this discussion). If the intensity of the pump pulse and the length of the loop 204 are selected appropriately, the differential phase shift will be π, and, when the clockwise signal and the counterclockwise signal are combined at the coupler 206, the differential phase shift will cause the light to be combined constructively and output from the output end 212 of the fiber 202 rather than from the output end 210. After the pump pulse has propagated through the fiber 202, the clockwise propagating signal is no longer affected by the change in the index of refraction. Thus, there is no longer a nonreciprocal phase shift when the pump pulse is not present, and the light once again combines constructively at the original port of the coupler and emerges from the output end 210 of the fiber 202.

The Kerr effect is naturally present in many materials, including the core of a silica-based fiber. However, the Kerr effect of silica is quite weak, and either a very long fiber or high pump power or a sufficient product of fiber length and pump power is required to induce the required $\pm(2n+1)\pi$ (n=0, 1, 2 . . . ) phase shift. A high power is obviously costly and undesirable. A long fiber is also undesirable because it increases the sensitivity of the loop 204 to external parameters such as temperature changes, pressure changes, acoustic waves, vibrations, or the like. Thus, it is desirable to utilize a different effect to provide the requisite switching.

A considerably stronger index-modifying effect is the resonant nonlinearity. The resonant nonlinearity is introduced in the fiber by doping its core (or its core and its cladding) with an absorber that absorbs light at the pump wavelength but absorbs minimal or no light at the signal wavelength. When a pump of proper wavelength is launched into such a fiber, it is absorbed by the dopant in the fiber. Thus, the pump light depletes the ground state electrons of the dopant and reduces the absorption of the dopant. Fundamental physics states that this absorption change is associated with a change in the refractive index of the core, and is thus associated with a change in the phase of the signal traveling in the core. In one embodiment described below, such a nonlinear fiber is spliced into the loop of a Sagnac interferometer. If the pump is launched into the loop, the pump induces a signal phase change in the nonlinear fiber. If, as described below, the phase change is applied nonreciprocally to the two counterpropagating signals in the interferometer, a differential phase change can be developed. If the differential phase change is an odd value of π, the signal is switched, as discussed above in connection with FIG. 2. With the right dopant, this nonlinearity can be up to a billion times stronger than the Kerr effect of silica. Consequently, far smaller powers and shorter fibers are required for switching than when using the Kerr effect, thus allowing switching to occur in an environmentally stable interferometer.

A fundamental limitation recently identified with this nonlinearity is the effect of nonradiative decay mechanisms within the dopant. Such mechanisms are often present in an absorber. The nonradiative decay mechanisms convert some of the absorbed pump power into phonons during the process of exciting the absorber's electrons and maintaining them in the excited state. These phonons heat the core of the nonlinear fiber and thus slightly increase the temperature of the nonlinear fiber. Because the refractive index of glass depends on temperature, the core index of the nonlinear fiber increases, which results in a thermal phase shift of the signal propagating in the nonlinear fiber.

In general, the two index-changing mechanisms described above can be present simultaneously in an active fiber—the nonlinear effect and the thermal effect. If the dopant is such that it induces no phonons (i.e., if all the transitions involved in the excitation and relaxation of the dopant are purely radiative), the thermal effect is null and only the nonlinear effect remains. In the other extreme, if the dopant turns all the absorbed pump power into phonons (the case of strongly nonradiative transitions), the thermal effect is very strong, and its contribution to the pump-induced phase shift can be comparable to, and even larger than, the contribution from the nonlinear effect. In the extreme case of a transition with a very weak oscillator strength (e.g., <$10^{-5}$), essentially only one effect remains—the thermal effect. In general, a dopant will exhibit some of both effects.

To understand why this thermal phase shift is generally undesirable (though not always, as this invention will teach), two dynamic regimes must be considered. The first regime, the instantaneous regime, can be understood by considering the effect of a single, short pump pulse in a Mach-Zehnder interferometer. This pump pulse is assumed to be short enough that while the pulse is on, the heat the pump generates in the fiber core does not have time to be taken away by conduction into the cladding. The heat remains in the core, where it generates a short burst of temperature rise and thus a short increase in the signal thermal phase shift.

Figure 3A:
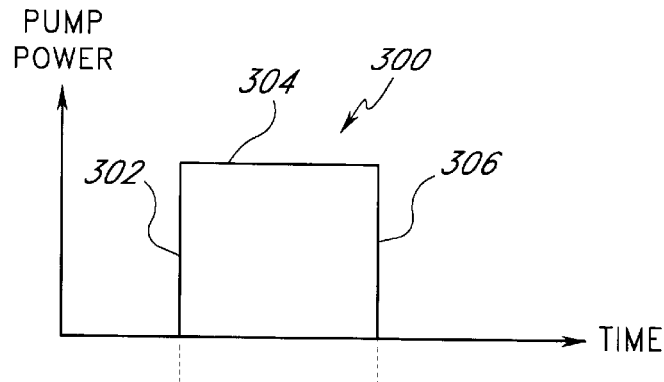
FIG. 3A illustrates a graphical representations of an optical pump applied to an active fiber.
Figure 3B:
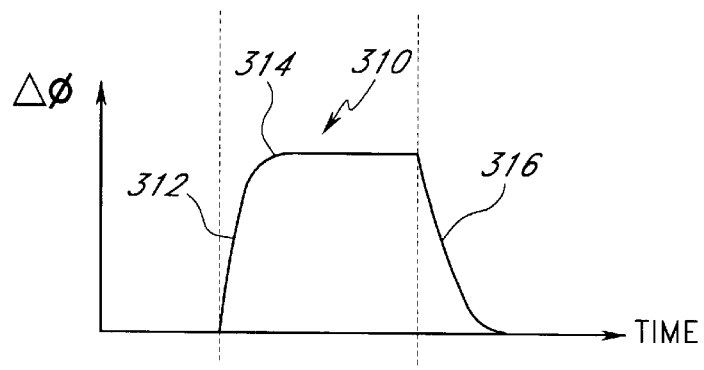
FIG. 3B illustrates a resulting phase change caused by the pump pulse of FIG. 3A when the pumped fiber exhibits a nonlinear effect in response to the pump pulse, but does not exhibit a thermal effect in response to the pump pulse.
Figure 3C:
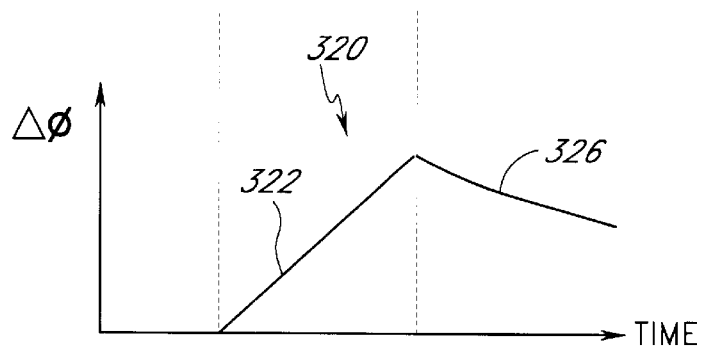
FIG. 3C illustrates a resulting phase change caused by the pump pulse of FIG. 3A when the pumped fiber exhibits a thermal effect in response to the pump pulse, but does not exhibit a nonlinear effect.

The temporal shape of the switched signal is determined by the index-modifying mechanisms, as illustrated in FIGS. 3A, 3B and 3C. In many switching applications, it is imperative to have sharp on and off switched signals. One approach to meet this objective is to utilize a pump pulse that exhibits a square shape, as illustrated by a pulse 300 in FIG. 3A having a rising edge 302, a level portion 304, and a falling edge 306.

FIG. 3B illustrates a resulting phase change 310 in the case where there is a nonlinearity but no thermal effect. If the nonlinearity is much faster than the pump width, the resulting phase change 310 will closely resemble the pump pulse 300. As an example, consider a nonlinearity with a 1-nanosecond response time and a pump pulse 50 nanoseconds wide with infinitely fast rise and fall times. Just after the rising edge 302 of the pump pulse 300, the phase changes in about 2–3 nanoseconds, as illustrated by a rising edge 312, and is followed by a level portion 314. The rise time of the phase change is power dependent and decreases with increasing power. Fifty nanoseconds later, just after the falling edge 306 of the pump pulse 300, the phase change 310 decreases in about 1 nanosecond, as illustrated by a falling edge 316. The phase change 310 thus has a rising edge 312 and a falling edge 316 of about 2–3 nanoseconds each and a width of about 48 nanoseconds, which is close to width of the original pump pulse 300.

Figure 3D:
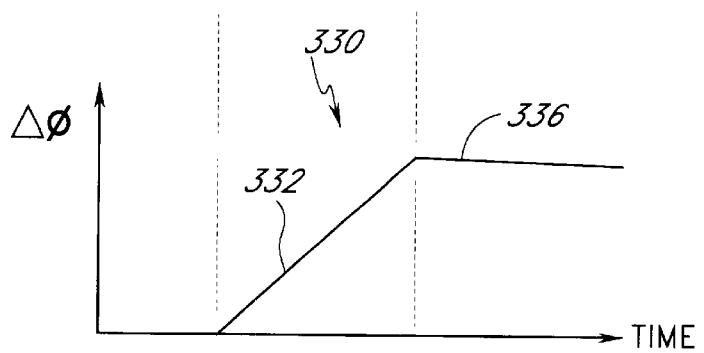
FIG. 3D illustrates the resulting phase change as in FIG. 3C when the thermal time constant $\tau_{th}^0$ was assumed to be much longer than in FIG. 3C, which leads to a nearly step-like thermal phase change.

FIG. 3C illustrates a resulting phase change 320 in the case where there is a thermal effect but no nonlinearity. For the purpose of this discussion, and to produce a fast switch, we assume that the pump pulse width $\tau_p$ is much smaller than the thermal fall time of the core. The latter depends on several parameters, in particular, the fiber core dimension, the fiber numerical aperture, and the dopant distribution, as taught in M. K. Davis, et al., Thermal Effects in Doped Fibers, *JOURNAL OF LIGHTWAVE TECHNOLOGY*, Vol. 16, No. 6, June 1998, pp. 1013–1023. As an example, for a standard single-mode fiber having light propagating therein at 1,550 nanometers, the thermal fall time is typically in the range of 1.5 to 14 microseconds. Theory shows that even if the pump pulse 300 is again a perfect square, the thermal phase change will increase approximately linearly, as illustrated by the rising edge 322, while the pump pulse 300 is on. Furthermore, after the pump pulse 300 is turned off, the thermal phase change decreases as $1/(1+t/\tau_{th})$, with a time constant approximately equal to $\tau_{th}$, as illustrated by a falling edge 326, which decreases at a rate slower than the rate of increase of the rising edge 322. The ratio of slopes (rise time to fall time) scales approximately as $\tau_p/\tau_{th}$. Since it has been assumed that $\tau_p$ is much shorter than $\tau_{th}$, the switched signal rises much faster than it falls. Thus, the thermal effect produces a phase change that looks like a triangle or a step, as illustrated in FIGS. 3C and 3D, respectively, rather than the required square. In FIG. 3D, the pump pulse width is the same as in FIG. 3C, but the thermal time constant $\tau_{th}$ was assumed to be even longer than in FIG. 3C, which leads to a nearly step-like thermal phase change.

Calculations show that for many dopants the magnitude of the thermal phase change can be quite large even for modest pump powers. (See, for example, M. K. Davis, et al., Thermal Effects in Doped Fibers, cited above.) It can, in fact, exceed the nonlinear phase change, even in a moderately strong nonlinear dopant. The thermal and nonlinear contributions can have the same sign or opposite signs, and thus can add or subtract, depending on the signal wavelength relative to the wavelength of the resonant transition responsible for the nonlinearity. When utilizing such dopants in a Mach-Zehnder switch, the switched signal has a complex shape that again does not resemble a square, and the switch is generally thought not to be usable.

Figure 4A:
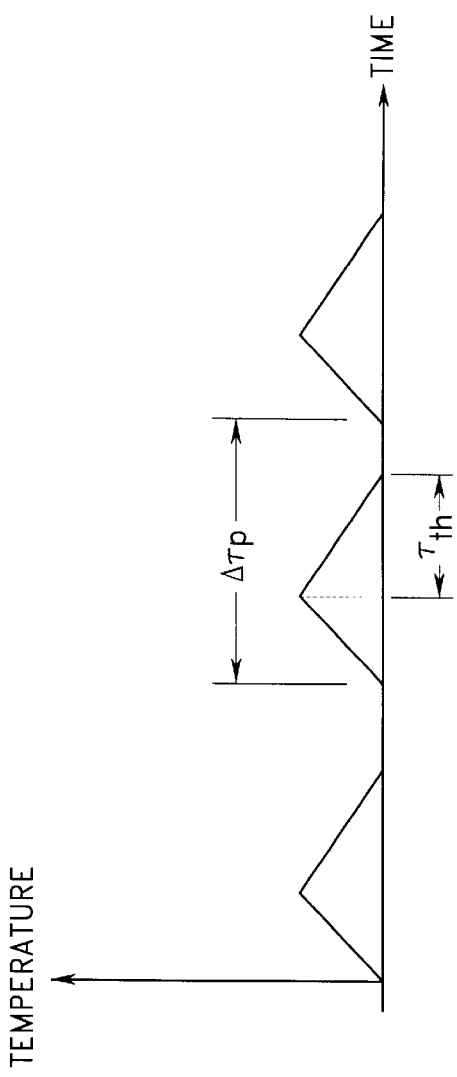
FIG. 4A illustrates a schematic of a thermal phase change which results when an active fiber is pumped at a pulse repetition rate having a period $\Delta\tau_p$ which is greater than the thermal decay time constant $\tau_{th}^0$ of the fiber core.

The instantaneous regime described so far occurs for a single short pump pulse. It also prevails for a low repetition rate, i.e., for a series of short pulses, as illustrated in FIG. 4A, which are sufficiently far apart (i.e., spaced by a time $\Delta\tau_p$ which is much greater than the thermal response time $\tau_{th}^0$ of the core, much more than shown in FIG. 4A). Then, no significant heat accumulates in the cladding over time. More specifically, the instantaneous thermal phase change caused by a given pump pulse, which decays with a time constant $\tau_{th}^0$, will have returned to zero by the time the next pump pulse arrives. At that time, the thermal conditions are exactly the same as for the first pulse, and the arguments developed so far apply for the second pulse, and all subsequent pulses.

Figure 4B:
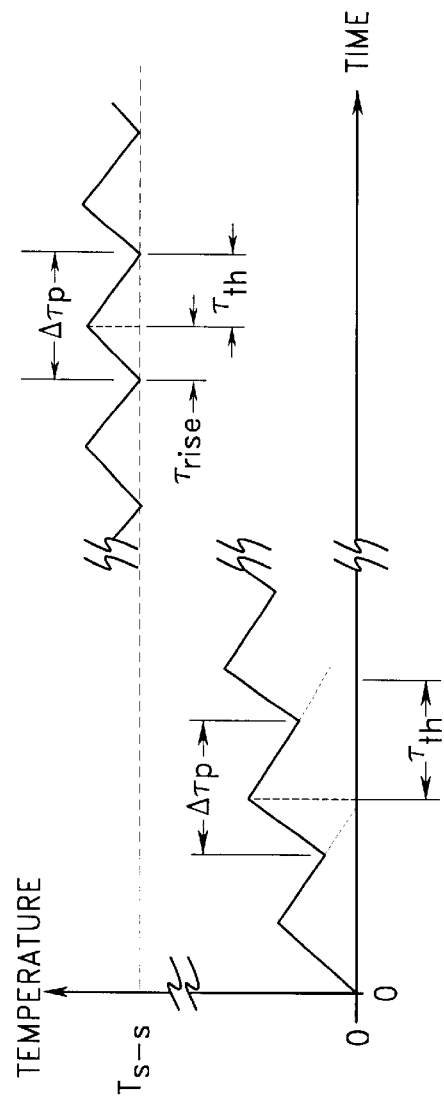
FIG. 4B illustrates a schematic of a thermal phase change which results when an active fiber is pumped at a pulse repetition rate having a period $\Delta\tau_p$ which is less than the thermal decay time constant $\tau_{th}^0$ of the fiber core.

A second thermal regime, called the steady-state regime, occurs when a series of closely spaced pump pulses 300 are applied or when the pump is on continuously. By closely spaced pump pulses is meant that the pump pulses are periodically spaced by a time $\Delta\tau_p$ which is comparable to, or shorter than, the thermal time constant $\tau_{th}^0$ of the fiber core when the fiber is pumped in the instantaneous regime, as illustrated in FIG. 4B. (Note that steady-state heating also occurs when $\Delta\tau_p$ is much greater than $\tau_{th}^0$, but it is then much weaker and is not of concern in this case.) It can be shown that after the interferometer reaches thermal steady state, the instantaneous thermal phase change caused by each pump pulse 300 decays with a time constant equal to $\Delta\tau^p - \Delta\tau_{rise}$ (where $\Delta\tau_{rise}$ is the rise time of the thermal effect caused by each pump pulse) so that the thermal phase change will have returned to a uniform steady-state value (e.g., $T_{s-s}$) by the time the next pump pulse 300 arrives. In other words, the thermal fall time $\tau_{th}$ of each individual instantaneous phase change depends on the pump repetition rate; specifically, the thermal fall time decreases as the pump repetition rate increases. Again, the arguments developed so far apply for every pulse. In conclusion, the foregoing discussion applies for any pulse repetition rate at thermal steady state. It should be pointed out, however, that as the repetition rate of the pump is increased, the average temperature of the fiber increases, as described below. This effect is deleterious, as it may eventually cause degradation and/or melting of the fiber, the jacket of the fiber, or elements in physical contact with or close proximity to the fiber.

In the steady-state regime, as the pumping time increases, the heat injected in the core propagates into the cladding. The temperature of both the core and cladding rises in response to the injected heat. After a sufficiently long time, which depends on the cladding diameter and is typically on the order of a second, the heat reaches the outer edge of the cladding. (If the fiber is jacketed, the heat reaches the outer edge of the jacket. For the purposes of the following discussion, it will be assumed, without loss of generality, that the fiber has no jacket.) At this point, heat is removed from the outside of the fiber, either by natural air convection if the fiber is surrounded by air, by forced convection if the fiber is cooled by a fan, by heat transfer if the fiber is cooled by a flowing liquid, or the like. In the following discussion, without implying any lack of generality, it will be assumed that the fiber is simply resting in still air and thus that the fiber is cooled by natural air convection. The rate of heat removal then increases with increasing temperature difference between the cladding surface and surrounding air. As more heat is delivered to the fiber, the cladding temperature increases and the rate of heat removal increases. After a certain time duration, an equilibrium is reached where the rate of heat injection into the fiber equals that of heat removal. At this time, the fiber temperature has reached some maximum steady-state profile, and the temperature stops increasing. Simulations show that for a standard fiber size (e.g., 125 microns in diameter) the time duration to reach this steady-state equilibrium is on the order of 1–10 seconds, and that the steady-state temperature profile across the fiber core and cladding is then almost uniform. (See, M. K. Davis, et al., Thermal Effects in Doped Fibers, *JOURNAL OF LIGHTWAVE TECHNOLOGY*, Vol. 16, No. 6, June 1998, pp. 1013–1023.) The temperature rise at steady state is far greater than the instantaneous temperature rise due to a single pump pulse having the same peak power as the continuous wave pump. Even with very small heat inputs, the steady-state thermal phase change associated with this temperature rise can be very high (e.g., multiples of $\pi$).

Figure 5A:
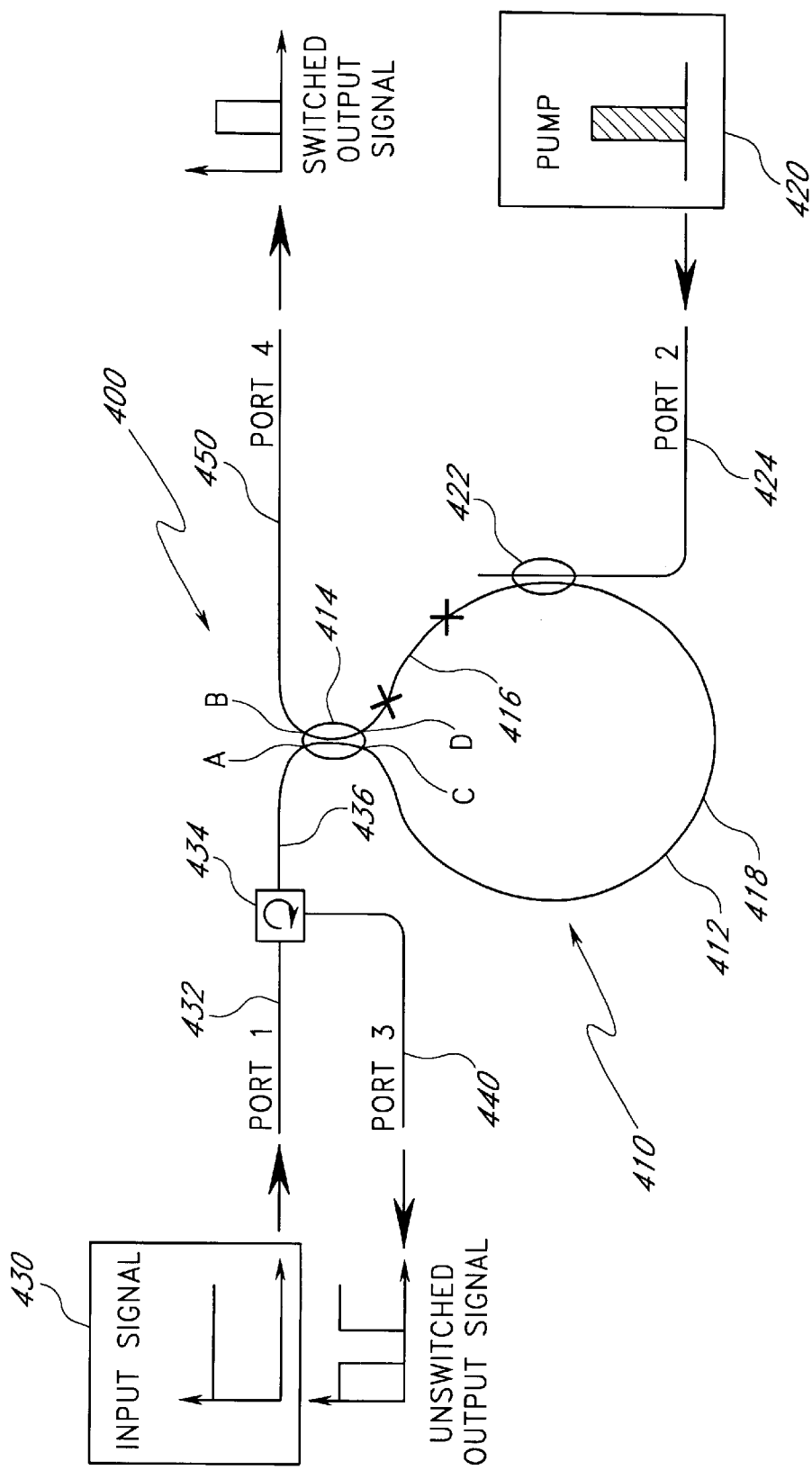
FIG. 5A illustrates a Sagnac switch in accordance with the present invention.

The foregoing problems are eliminated by the present invention, which comprises the fiber switch architecture illustrated by a switch 400 in FIG. 5A in which ports 1, 2, 3 and 4 are labeled to correspond to the ports in FIG. 2. The switch 400 comprises a Sagnac fiber interferometer 410. The interferometer 410 comprises a fiber loop 412 having a total length L and a first fiber coupler 414. The first fiber coupler 414 is a four-port coupler which includes a port A, a port B, a port C and a port D. Loop ends are connected to port C and port D of the first coupler 414. The first fiber coupler 414 couples approximately 50% of the light at the signal wavelength. A shorter active (e.g., doped) fiber 416 is placed asymmetrically inside the loop 412 and is positioned near the 3-dB coupler 414. Thus, the loop 412 comprises a length of the active fiber 416 and a length of inactive (i.e., undoped)

fiber 418. Pump light from a pump source 420 is injected into the active fiber 416 by a second coupler 422, which is a wavelength division multiplexing (WDM) coupler. The second coupler 422 is coupled to the pump source 420 via a pump input fiber 424 (port 2). The second (WDM) coupler 422 is configured to couple all the pump light into the loop 412. The second (WDM) coupler 422 is further configured to not couple the signal out of the loop 412 (i.e., the second (WDM) coupler 422 couples substantially 0% of the light at the signal wavelength). The second (WDM) coupler 422 is preferably positioned close to the active fiber 416 so that the pump signal propagates through very little of the undoped optical fiber 418. Thus, the pump light has little effect on the refractive index of the undoped optical fiber 418. Rather, substantially all of the effect of the pump light is concentrated in the active fiber 416.

An input signal from a signal source 430 is transmitted via an input fiber 432 (port 1) to an optical circulator 434 and then via an input/output fiber 436 to port A of the first coupler 414. For the purposes of the following discussion, it is assumed that the input signal is a continuous wave signal. The first coupler 414 launches the signal light into the loop 412 from port C and from port D with substantially equal power in the two directions to cause the signal light to propagate in the loop 412 as two counterpropagating light signals (a clockwise (CW) signal and a counterclockwise (CCW) signal). In the absence of pump light, the counterpropagating signals experience the same phase delay around the loop 412. Thus, when the two counterpropagating signals reenter the first coupler 414 via port C and port D and are recombined therein, the two signals destructively interfere at port B but are recombined constructively at port A (i.e., the original input port). Thus, the combined signals are directed back through the input/output fiber 436 toward the circulator 434. The circulator 434 then directs the signal via an output fiber 440 which functions as an output port (port 3) for the unswitched output signal (i.e., the output signal which occurs when no pump signal is applied).

Note that the optical circulator 434 is a three-port device which operates in a well-known manner to cause substantially all the light entering through a first port (e.g., the port connected to the input fiber 432) to be coupled out of the next adjacent port (e.g., the second port connected to the input/output fiber 436). The optical circulator 434 is a unidirectional device, which means that the light circulates in the circulator 434 in one direction only (e.g., clockwise in FIG. 4). Thus, light which returns from the Sagnac loop 412 in the fiber 436 and enters the second port of the circulator 434 is coupled to the third port and therefore to the output fiber 440. No light enters the third port of the circulator 434. No light is coupled from the input/output fiber 436 back to the first port connected to the input fiber 432. The circulator 434 thus operates as an isolator to isolate the input fiber 432 from the input/output fiber 436. Similarly, the circulator 434 prevents light on the input fiber 432 from being propagated directly to the output fiber 440. An exemplary optical circulator 434 is available from E-TEK Dynamics, Inc., 1885 Lundy Avenue, San Jose, Calif. 95131.

As will be discussed in more detail below, when a pump pulse from the pump source 420 is applied via the second (WDM) coupler 422, the two counterpropagating light signals experience different phase shifts because of the effect of the pump signal on the active fiber 416 and because of the asymmetrical location of the active fiber 416. Assuming that the differential phase shift is ±π or an odd multiple of ±π (i.e., a phase shift of ±(2n+1)π for n=0, 1, 2, . . . ), the two signals interfere destructively in port A of the coupler 414 and interfere constructively in port B of the coupler 414. An output fiber 450 (port 4) couples the output signal from port B of the coupler 414 as a switched output signal. In other words, the signal light is coupled to the output fiber 450 (port 4) as the result of the application of a pump signal pulse.

The operation of the active fiber 416 in providing the asymmetrical delay can be understood from the following discussion. In the following discussion, reference is made to the transit time $\tau_L$ through the loop 412. It is assumed that the total length L of the loop 412 includes both the active fiber 416 and the undoped fiber 418 in the loop 412. Thus, the transit time $\tau_L$ includes the propagation time through the active fiber 416 as well as the transit time through the undoped fiber 418 of the loop 412. It is further assumed that the length of the active fiber 416 is much, much less than the overall length of the loop 412. It should be noted that in alternative embodiments, the length of the active fiber 416 can be a substantial portion of the overall length of the loop 412 (e.g., up to less than one-half of the overall length), and the present invention will still work.

First, it is assumed that the dopant in the doped fiber 416 exhibits no thermal effects, and exhibits only nonlinearity. When using such an active fiber 416 in conjunction with the present invention, both the rise time and the fall time of the nonlinear shift induced by the pump in the fiber are relevant to the switch characteristics. The resonant nonlinearity is characterized by a response time $\tau_{nl}$. This parameter affects both the rise time and the fall time. Regarding the fall time, the physical meaning of $\tau_{nl}$ can be understood as follows. A length of fiber doped with a nonlinear dopant is excited optically by a pump. After the pump is turned off, electrons in the excited state decay exponentially with a time constant equal to $\tau_{nl}$ (i.e., the fall time of the phase shift is equal to $\tau_{nl}$).

The connection between $\tau_{nl}$ and the rise time is more complex because the pump power is involved. For the following discussion, it is assumed that the pump repetition rate is low and is smaller than about $1/\tau_{nl}$. In the case of low peak pump power where the peak pump power is smaller than or equal to the saturation power of the dopant in the fiber, as the pump pulse width $\tau_{pump}$ is increased from zero while keeping the peak pump power constant, at first the nonlinear phase shift $\Delta\phi$ induced by the pump in the fiber at a given signal wavelength increases linearly with $\tau_{pump}$. When $\tau_{pump}$ becomes equal to about $\tau_{nl}$, $\Delta\phi$ continues to grow but at a sublinear rate that decreases as $\tau_{pump}$ increases. When $\tau_{pump}$ reaches a few $\tau_{nl}$, the phase shift $\Delta\phi$ reaches its maximum (or asymptotic) value and does not grow any more, even if $\tau_{pump}$ is further increased. In practice, the value of $\tau_{pump}$ for which the phase shift $\Delta\phi$ has reached its asymptotic value is often taken to be about $3\tau_{nl}$. The rise time $\tau_{rise}$ of the phase shift can thus be defined somewhere in the range of $\tau_{nl}$ to $3\tau_{nl}$. For the purposes of the present application, $\tau_{rise}$ is defined as $\tau_{nl}$, at which time the phase shift has reached approximately 63% of its asymptotic value.

When the pump peak power is increased and the foregoing steps are repeated, the phase shift rises faster and faster as the peak pump power increases. This behavior is explained as follows. Assume that the pump energy is maintained constant. Thus, as the pump pulse width is decreased, the peak pump power is increased in the same ratio to keep the energy constant. As $\tau_{pump}$ is decreased from $\tau_{nl}$, the energy delivered by the pump pulse to the dopant remains the same. Consequently, the narrower pump pulse induces in the dopant substantially the same electronic population change as when $\tau_{pump}$ is equal to $\tau_{nl}$. Thus, the nonlinear phase shift induced by the pump pulse also remains the same. The difference is that because $\tau_{pump}$ is now shorter, the time it takes for the phase shift to reach the same value is shorter (i.e., $\tau_{rise}$ is shorter and substantially equal to $\tau_{pump}$) In summary, the rise time of the nonlinear phase shift decreases as the pump pulse width is decreased while keeping the pump energy constant.

For the following discussion, it is assumed that the nonlinearity of the active fiber 416 has a rise time $\tau_{rise}$ much shorter than the transit time $\tau_L$ of the light through the loop 412. If, at an initial time (t=0), a high intensity (several saturation intensities) pump pulse with a width $\tau_{pump}$ much shorter than $\tau_{rise}$ is launched into the loop 412 via the pump input fiber 424 and the second (WDM) coupler 422, the pump signal will induce, on the scale of $\tau_{pump}$, a nonlinear index change in the active fiber 416. As mentioned above, it is assumed that the optical input signal is a continuous wave signal. It should be understood, however, that the present invention can be adapted for use with pulsed signals. Thus, at any time, the loop 410 is filled with clockwise propagating signal light and counterclockwise propagating signal light. In the illustrated embodiment, the active fiber 416 is positioned in the loop 410 such that the clockwise (CW) propagating signal light propagates through the active fiber 416 shortly after exiting the coupler 414 at port D and before propagating through the undoped fiber 418 in the loop 412, and such that the counterclockwise (CCW) propagating signal light exits from port C of the coupler 414, propagates through the undoped fiber 418 of the loop 412 first and then propagates through the active fiber 416 shortly before it reenters the coupler 414 via port D. Thus, the counterclockwise signal about to emerge from the loop 412 and enter port D exhibits a nonlinear phase change immediately following the activation of the pump pulse. However, the clockwise signal that interferes with it at the coupler went through the nonlinear fiber $\tau_L$ earlier, when the fiber was not yet pumped, and it has experienced no nonlinear phase change. Consequently, there is a pump-induced differential phase change $\Delta\phi$ between the two interfering signals. The pump power is selected such that $\Delta\phi=\pi$, and the two counterpropagating signals now constructively recombine in port 4 (i.e., the total signal power has been switched from port 3 to port 4) and the combined signal is output on a switched output fiber 450 as a switched output signal.

Figure 6A:
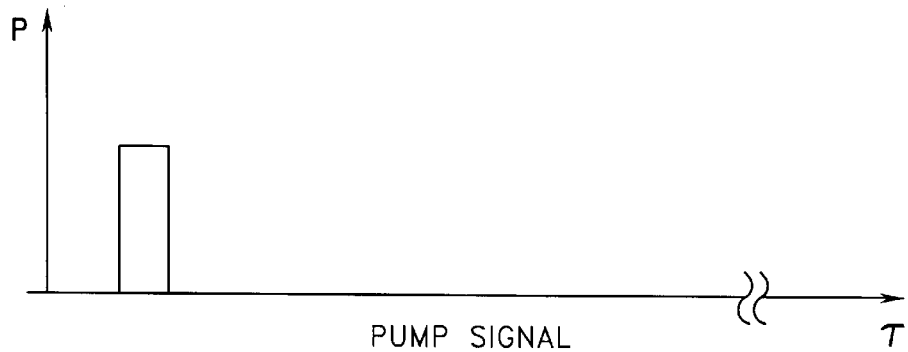
FIG. 6A illustrates an exemplary pump signal pulse applied to the Sagnac switch of FIG. 5A or the Sagnac switch of FIG. 5B.
Figure 6B:
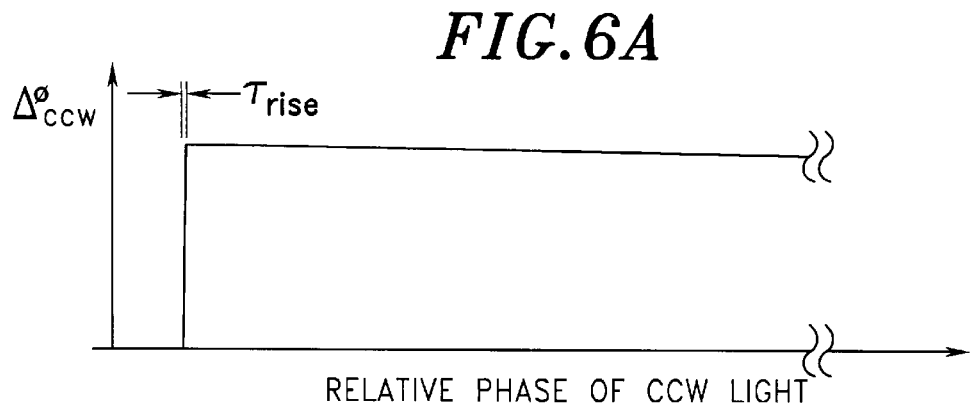
FIG. 6B illustrates the relative change in phase of the counterclockwise (CCW) propagating signal in response to the pump signal pulse of FIG. 6A.
Figure 6C:
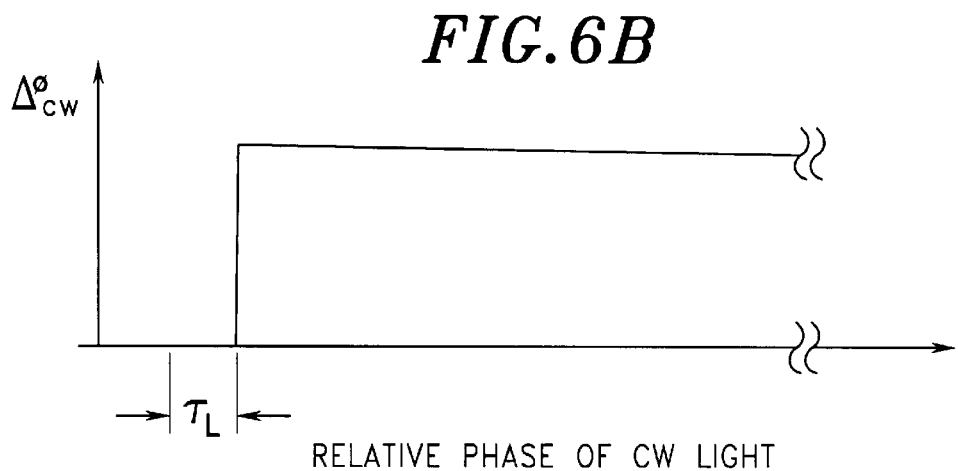
FIG. 6C illustrates the relative change in phase of the clockwise (CW) propagating signal in response to the pump signal pulse of FIG. 6A.

The foregoing is illustrated in FIGS. 6A, 6B, 6C and 6D. When a pump signal is applied to the interferometer, as illustrated by a pump pulse in FIG. 6A, the pump pulse causes a rapid change in the refractive index of the active fiber 416. Because, for the purpose of this discussion, it is assumed that the loop 412 has signal light propagating in it at all times, both the clockwise propagating signal light and the counterclockwise propagating signal light see the change in the refractive index and undergo respective phase changes caused by the change in the refractive index of the active fiber 416. Because of the location of the active fiber 416 proximate to port D of the coupler 414, the counterclockwise propagating light signal having the phase change emerges from the loop active fiber 416 and enters port D of the coupler 414 shortly after its phase is changed by the change in the refractive index. Thus, in FIG. 6B, the phase change $\Delta\phi_{CCW}$ of the counterclockwise propagating light signal is shown as occurring immediately after the beginning of the pump pulse with a rise time determined by the response of the active fiber 416 to the pump pulse. (For the purpose of this discussion, it is assumed that the lengths of the fiber from the second (WDM) coupler 422 to the active fiber 416 and the length of the active fiber 416 are much, much less than the overall length of the loop 412, and the delays through these short lengths of fiber are not represented in FIGS. 6A–6D.) Although the clockwise propagating light signal also experiences an immediate phase change, the clockwise propagating light signal must propagate through the entire length of the undoped fiber 418 in the loop 412 before any of the clockwise propagating light which experienced the phase change enters port C of the coupler 414. Thus, again ignoring the relatively short distance between the two couplers 414, 422, the phase change of the clockwise propagating light appears at port C of the coupler 414 at a time delayed by the propagation time $\tau_L$ of the loop 412, as illustrated in FIG. 6C. During the propagation time $\tau_L$, the signal light from the loop 412 combining in the coupler 414 comprises the counterclockwise propagating light signal which has experienced the phase change and the clockwise propagating light which passed through the active fiber 416 before the pump pulse was activated. Thus, during the time $\tau_L$, the two counterpropagating light signals combining in the coupler 414 have a differential phase shift. The intensity of the pump pulse and the length of the active fiber 416 are selected so that the differential phase shift is $\pi$. Thus, rather than combining constructively in port A of the coupler 414, the counterpropagating light signals combine constructively in port B of the coupler 414, and are therefore output as a switched signal therefrom, as illustrated by the flat portion of the pulse in FIG. 6D.

Figure 6D:
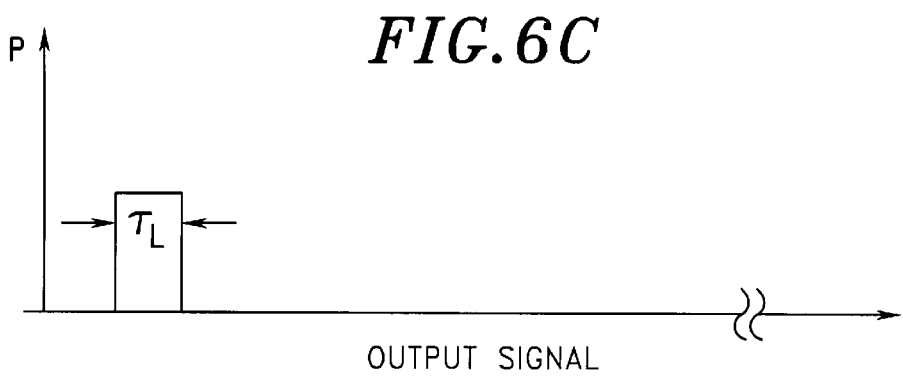
FIG. 6D illustrates the output signal resulting from the difference in the relative phase changes of the clockwise and counterclockwise signals of FIGS. 6B and 6C.

The present invention illustrated in FIG. 5A automatically switches the output signal back to the original coupler port when the clockwise propagating signal light having the phase change reaches port C of the coupler 414. In particular, as illustrated in FIG. 6C, the phase shift $\Delta\phi_{CW}$ of the clockwise propagating light signal arrives at port C of the coupler 414 at the end of the delay time $\tau_L$, at which time the two phase changes (FIGS. 6B and 6C) are substantially equal. Thus, at the end of the time $\tau_L$, the two counterpropagating signals combine constructively at port A of the coupler 414 and substantially no light is output from port B of the coupler 414. Thus, as illustrated in FIG. 6D, the output signal switches off. By adjusting the length of the loop 412 (including the length of the active fiber 416), the width of the output pulse in FIG. 6D can be controlled.

With respect to the fall time of the switch, it can be initially assumed that the index change returns to zero with a time constant $\tau_{nl}$ (which is true unless depumping schemes are involved, as taught, for example, in J. W. Arkwright, et al., An investigation of Q-switched induced quenching of the resonant nonlinearity in neodymium doped fibers, *JOURNAL OF LIGHTWAVE TECHNOLOGY*, Vol. 14, No. 1, January 1996, pp. 110–120), and that the time constant $\tau_{nl}$ is much greater than $\tau_L$. Then, at t=$\tau_L$, the CW signal goes through the active fiber and undergoes nominally the same phase shift as the CCW signal had $\tau_L$ earlier. Thus, the two signals have nominally the same phase, and the signal returns to port A of the coupler 414 and thence to the unswitched output fiber 440. An important feature of the present invention is that even if the response is slow, the switch can be turned off very quickly provided that the transit time $\tau_L$ is sufficiently short (i.e., the length of the loop 412 is short). The foregoing assumes that the duration of the pump pulse and the time required for light to travel through the active fiber 416 are less than the loop transit time $\tau_L$.

One limitation to the foregoing is that after t=$\tau_L$, no other pump pulse should be applied until t is equal to one to a few $\tau_{nl}$ in order that the nonlinearity may return to zero. Applying a pump pulse earlier will not create the required index change (unless a higher pump power is applied) because the dopant's electrons are still partially in the excited state. Thus, the maximum switch repetition rate is approximately $1/\tau_{nl}$.

The basic condition that must be met is that the dopant has a very short nonlinear rise time, namely $\tau_{rise} \ll \tau_L$. Advantageously, the length $L_{active}$ of the active fiber 416 is much, much less than the overall length L of the loop 412, namely $L_{active} \ll L$. Since $\tau_L = nL/c$, where c is the speed of light and n is the fiber refractive index, the length of the loop 412 must be sufficiently long to make $\tau_L$ much greater than $\tau_{rise}$. For example, if $\tau_{rise} = 1$ nanosecond, a length must be selected which is at least equal to $L = \tau_{rise} c/n$ (with $c \approx 3 \times 10^8$ meters/second and $n \approx 1.45$), or 0.21 meter. A length of 1 meter would be suitable. However, if $\tau_{rise} = 1$ microsecond, the minimum length L becomes $\approx 210$ meters, which is becoming prohibitive if one wants to keep the size and cost of the switch low. Many of the nonlinear dopants identified and tested so far have fall times $\tau_{nl}$ in the range of 100 microseconds to 1 millisecond. With these, this proposed scheme will still work but repetition rates are limited to 1–10 kHz. Again, the rise time can be shortened by pumping harder (i.e., delivering the same amount of energy in a shorter amount of time).

To summarize the foregoing, the exemplary embodiment uses a dopant with a nonlinear response time $\tau_{nl}$, as fast as possible (although a few milliseconds would work unless a very fast repetition rate is desired) and pumps the fiber 416 with a sufficiently high pump peak power that the nonlinear index rise time $\tau_{rise}$ is as short as possible. By selecting a loop delay $\tau_L$ longer than $\tau_{rise}$, an environmentally stable switch can be produced with a rise time $\tau_{rise}$, an on-time $\tau_L$, a fall time $\tau_{nl}$, and a maximum repetition rate of approximately $1/\tau_{nl}$.

The present invention will now be considered with respect to a dopant having dominantly thermal effects. The rise time of the index change is now imposed by how fast heat is generated in the dopant. This depends on both the pump pulse length and the time constant of phonon generation. The latter depends on the dopant spectroscopy, particularly the energy spacing between the levels involved in the nonradiative relaxation caused by clusters, but it can be very fast (i.e., in the nanosecond range or less). If the pump pulses are comparably short, the heat will be deposited in the fiber on a nanosecond scale or shorter. The rise time of the signal phase change, i.e., how fast the signal is switched to port B of the coupler 414, will also be in this range. The first necessary condition for this to happen (i.e., for the CCW signal to experience a negligible phase change during most of $\tau_L$) is that $\tau_L$ is long compared to the rise time of the index change $\tau_{rise}$, i.e., that $\tau_L = nL/C > \tau_{rise}$. For example, if $\tau_{rise} = 1$ nanosecond, L must be at least approximately 21 centimeters. A possible compromise may be to use a length twice this long or longer. The second necessary condition is that the length of the active fiber 416 in which the thermal effect takes place is much shorter than the total length of the loop 412 (i.e., the length of the fiber 416 is much shorter than the sum of the length of the active fiber 416 and the undoped fiber 418).

To determine the effect of the fall time, it can be assumed that the loop has a transit time $\tau_L \ll \tau_{th}$ so that the primary cause of switching the output signal back to the unswitched port is the effect of the Sagnac loop. There are two regimes of interest, namely low and high pump repetition rate. If the repetition rate is low, i.e., if the time between consecutive pulses is larger than the thermal response time $\tau_{th}^0$, the fall time of the thermal index change will be the order of $\tau_{th}^0$. ($\tau_{th}^0$ is again used herein to mean the fall time of the thermal index change when a single pump pulse is applied.) At time $t = \tau_L$, the CCW signal reaches the active fiber 416 and also experiences a phase shift. Because $\tau_L \ll \tau_{th}$, the pump-induced index change has decayed minimally during the period $t = \tau_{rise}$ to $t = \tau_L$, and the phase shift experienced by the CCW signal is almost the same as that experienced $\tau_L$ earlier by the CW signal. Thus, at the first coupler 414, for $t > \tau_L$, the two recombining signals have experienced almost the same phase shift. Therefore, the two signals interfere constructively in port A of the coupler, and the combined signal is output from the unswitched output fiber 440 (port 3). Again, the Sagnac architecture forces the device to be switched back at a rate that is fast compared to the fall time of the active fiber.

In general, the rise time of the pump-induced phase change depends on the length of the active fiber 416, on the temporal width of the pump pulse, and on the response time of the dopant. In the case of a purely thermal dopant, the response time of the dopant depends on the spectroscopy of the dopant and the pump wavelength. In the case of a nonlinear dopant, the response time of the dopant depends in particular on the spectroscopy of the dopant and the peak pump power. In the present application, it is assumed that the length of the active fiber 416 is sufficiently short and the width of the pump pulses is sufficiently short that the rise time of the phase change is not limited by the length of the active fiber 416. Rather, the rise time of the phase change is primarily controlled by the rise time of the dopant. Similarly, although the fall time of the pump-induced phase change also depends on the length of the active fiber 416 and on the response time of the dopant, for the purposes of the present application, it is assumed that the length of the active fiber 416 is sufficiently short that the fall time of the phase change is primarily controlled by the fall time of the dopant.

Figure 5B:
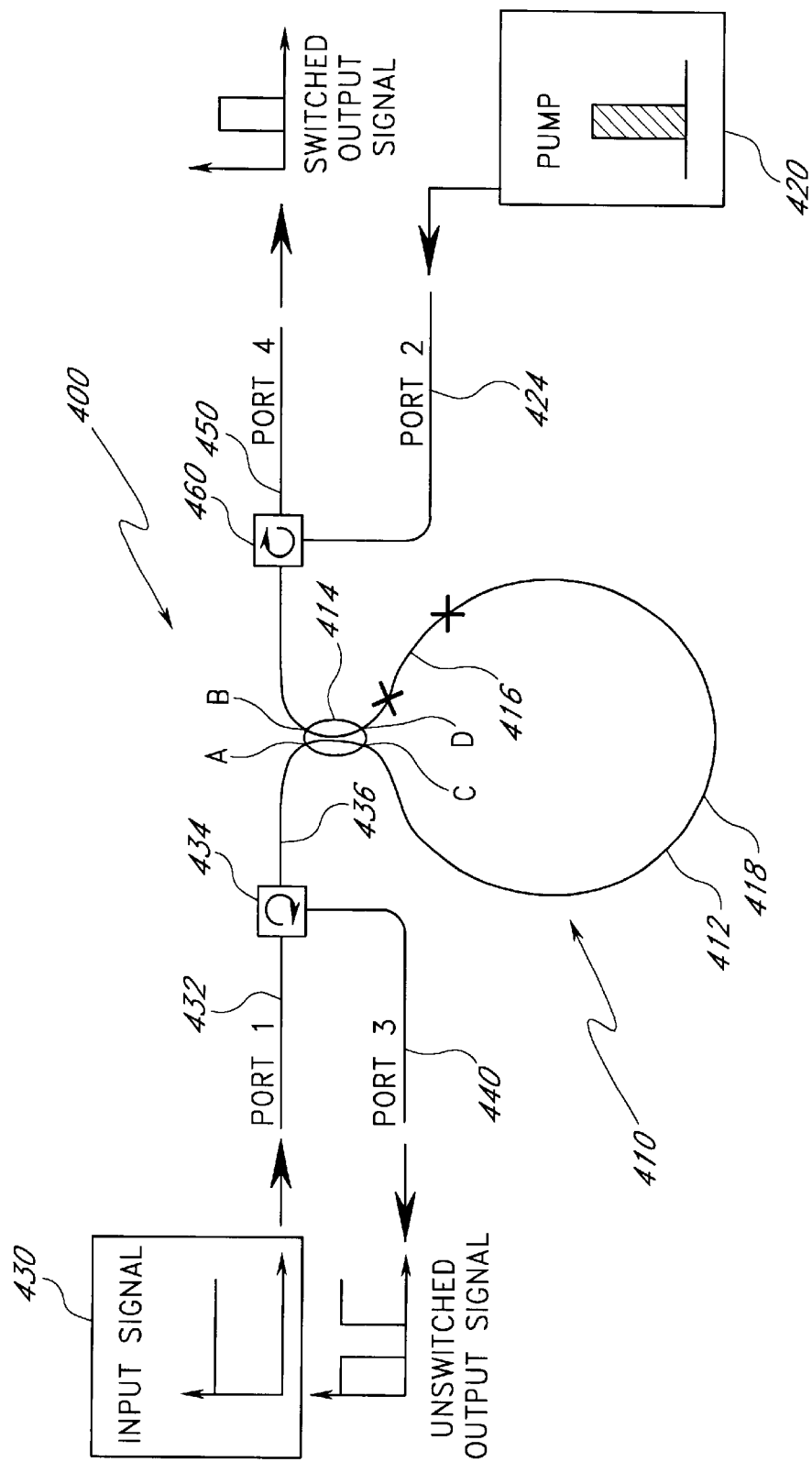
FIG. 5B illustrates an alternate embodiment to the switch of FIG. 5A wherein the pump is injected outside the interferometer loop.

FIG. 5B illustrates an alternative embodiment to the embodiment of FIG. 5A. In FIG. 5B, like elements are identified as in FIG. 5A. Unlike FIG. 5A, the embodiment of FIG. 5B applies the pump pulse from outside the loop 412, thus eliminating the need for the coupler 422 in the loop 412. In particular, a second optical circulator 460 is inserted into the switched output fiber 450. The second optical circulator 460 has a first port at the left which receives light from port B of the coupler 414 and which transfers the light to a second port at the right, which is connected to port 4 so that the light is provided as the output signal as before. A third port of the second optical circulator 460, shown at the bottom, receives pump light from the pump input fiber 424 and transfers the pump light to port B of the coupler 414. As discussed above in connection with the first optical circulator 432, the second optical circulator 460 circulates light in one direction only (e.g., clockwise) from one port to the next port only. Thus, all of the pump light is provided to port B of the coupler 414, and all the output light from port B of the coupler 414 is provided as the switched output signal at port 4. Note that the coupler 414 is preferably a wavelength division multiplexing (WDM) coupler which couples 50% of the light at the signal wavelength and which couples 0% percent of the light at the pump wavelength. Thus, substantially all the pump light is coupled to the loop 412 to circulate in the clockwise direction, and therefore propagates in the active fiber 416 where it is absorbed.

An alternative embodiment of the architecture of FIG. 5B would be to reverse the orientation of the arrow in the circulator 460 and inject the pump power from the pump source 420 at port 4. Another alternative embodiment would be to add a WDM coupler on port 1 and use it to inject the pump light from the pump source 420 into the loop 410. The coupling ratio of the WDM coupler 414 at the pump wavelength would then need to be 100% if it is desirable to have the pump pulse travel through the active fiber 416 before traveling in the undoped fiber 418.

It should be recognized that in the embodiments of FIGS. 5A and 5B it may be desirable to minimize the Kerr phase shift induced in the undoped fiber 418. If this is the case, this minimization can be implemented by launching the pump in such a way that the pump travels through the active fiber 416 (where it is at least partially absorbed) before it travels through the undoped fiber 418, as is, for example, achieved in the particular embodiment of FIG. 5A. If the Kerr effect is weak compared to the phase shift in the active fiber 416, then the placement of the pump injection port is not critical. On the other hand, if the Kerr effect is strong compared to the effect of the active fiber 416, then the pump should be injected close to the active fiber 416, and into the active fiber 416 first.

The operation of the embodiments of FIGS. 5A and 5B is illustrated in FIGS. 6A, 6B, 6C and 6D wherein FIG. 6A illustrates an exemplary pump signal pulse applied to the Sagnac switch of FIG. 5A or the Sagnac switch of FIG. 5B; FIG. 6B illustrates the relative change in phase of the counterclockwise (CCW) propagating signal in response to the thermal effect of the pump signal pulse of FIG. 6A; FIG. 6C illustrates the relative change in phase of the clockwise (CW) propagating signal in response to the thermal effect of the pump signal pulse of FIG. 6A; and FIG. 6D illustrates the switched output signal resulting from the difference in the relative phase changes of the clockwise and counterclockwise signals of FIGS. 6B and 6C.

It should be understood that any pump-dependent mechanism that produces a similar temporal phase change in the light propagating in the fiber can be used to implement the present invention by selecting a loop length such that the delay $\tau_L$ through the loop should be longer than the rise time of the pump-dependent mechanism causing the phase change and shorter than the fall time of the mechanism.

The second case is for a high pump repetition rate, i.e., consecutive pump pulses spaced by $\Delta\tau_p \leq \tau_{th}^0$. It has been shown that the fall time of the thermal index is then equal to $\Delta\tau_p - \tau_{rise}$, i.e., is shorter than under low-repetition rate pumping. As discussed above, if $\tau_L << \Delta\tau_p$, the Sagnac interferometer automatically turns off the switched output signal at a time equal to $\tau_L$. Because, as discussed above, $\tau_{th}$ decreases as the pump repetition rate increases, the repetition rate of the switch increases with the pump repetition rate. In practice, a high repetition rate is difficult to achieve because it requires a very high average pump power and a correspondingly high temperature rise of the fiber. (For example, a temperature rise greater than 100° F. is easily achievable even with a moderate average pump power.) In practice, a higher repetition rate regime can be achieved with special fiber cooling arrangements.

Note that the fall time should be sufficiently long that the clockwise signal and the counterclockwise signal experience substantially the same phase change although they pass through the active fiber 416 at times spaced apart by the loop transit time $\tau_L$. If the phase shift caused by the thermal effect decays significantly between the time the counterclockwise signal passes through the active fiber 416 and the time when the corresponding clockwise signal passes through the active fiber 416, the two signals will experience different phase changes. The difference in phase changes will prevent the output signal from switching completely back to the unswitched port 3. Thus, the extinction ratio of the signal in the unswitched port 3 to the signal in the switched port 2 may not be adequate for some applications requiring a very large extinction ratio. It is therefore preferable to have the fall time be much greater than the loop transit time $\tau_L$. There is therefore a trade-off between extinction ratio and repetition rate. In particular, longer fall times yield high extinction ratios and lower repetition rates, whereas shorter fall times yield lower extinction ratios and higher repetition rates.

As an application of the foregoing principle relating to the operation of the switch and the dependence on pump power described earlier in the context of the present invention, the case of $Nd^{3+}$ as the nonlinear dopant is considered. It is assumed that the thermal effect is small compared to the nonlinear effect (e.g., for the case when the pump wavelength is approximately 800 nanometers). The lifetime of the excited level for $Nd^{3+}$ in silica. and thus $\tau_{nl}$, is typically in the neighborhood of 400 microseconds. For a fiber exhibiting a strong optical confinement, the saturation power may be on the order of 5 milliwatts. If the fiber is pumped with pulses having a low duty cycle (small compared to $\frac{1}{400}$ microseconds or approximately 2.5 kHz), at a power level of 5 milliwatts, the rise time $\tau_{rise}$ of the nonlinear phase shift is, with the limitation discussed above, also in the range of 400 microseconds. Since the delay through the loop length 412 must be longer than $\tau_{rise}$, a very long fiber on the order of at least 160 kilometers must be used. Because such a long fiber is impractical, a better utilization of the dopant is to pump the fiber at a much higher power level, e.g., a hundred times higher. Specifically, pump pulses having a width of 4 microseconds and having a peak power of 500 milliwatts can be used to provide the same pump energy with significantly greater pump power. In such a case, the rise time is reduced to around 4 microseconds, and the minimum loop length required decreases by a factor of 100 to about 1,600 meters.

Similar numerical calculations can be applied to other dopant materials. For example, an optimized dopant advantageously has a minimum switching power corresponding to a saturation power of 2 milliwatts, independently of its $\tau_{nl}$, while $\tau_{nl}$ can, in principle, be no shorter than around a few nanoseconds (depending on several dopant parameters). In one example, if the dopant has a $\tau_{nl}$ of 1 microsecond and is pumped with pump pulses having a peak power of 200 milliwatts and a pump width $\tau_{pump}$ of 10 nanoseconds, the rise time $\tau_{rise}$ of the switch will also be 10 nanoseconds. The minimum required fiber length will be very short (i.e., around 4 meters). If a fiber length of, for example, 4 meters is used and if the dopant length is assumed to be much shorter than 2 meters (as would be the case for such a dopant), the switched pulse width is 20 nanoseconds. This switched pulse width is much shorter than $\tau_{nl}$ of 1 microsecond. The product of power and total length required for this switch is thus 0.2 watts times 4 meters (i.e., 0.8 watt-meters). The product of power multiplied by doped fiber length is even shorter—typically in the 0.1 to 1.0 watt-millimeters range. These products are considerably lower than the product required for any silica fiber Sagnac switches which rely on the Kerr effect, for which Kerr effect switches the power-length product is typically in the range of several hundred watt-meters. (See, N. J. Doran, et al., Experimental Investigation of All-Optical Switching in Fibre Loop Mirror Device, *ELECTRONICS LETTERS*, Vol. 25, No. 4, Feb. 18, 1989, pp. 267–269; and M. Jinno, et al., Demonstration of laser-diode-pumped ultrafast all-optical switching in a nonlinear Sagnac interferometer, *ELECTRONICS LETTERS*, Vol. 27, No. 1, Jan. 3, 1991, pp. 75–76.)

One of the advantages of the Sagnac switch 400 is its insensitivity to slow external perturbations. How slow depends on the loop length L. For example, if the temperature of a portion of the loop 412 is modified by external heating on a time scale slower than $\tau_L$, the CW and CCW signals will experience nominally the same phase change and the switch output will remain unchanged. Similarly, the Sagnac switch 400 is insensitive to slow fluctuations in temperature gradients. Also, if the dopant exhibits thermal processes, the switch 400 is insensitive to variations in steady-state index change due to slow variations in pump power with respect to the delay $\tau_L$ through the loop 412.

A second advantage of the present invention, as discussed above, is that the Sagnac switch 400 supplies an automatic mechanism to switch off the signal very rapidly even if the dopant nonlinearity itself has a long fall time. This means that many dopants which would be unusable in other interferometers can be used in the Sagnac switch 400.

A third advantage is that the on-time of the switch can be adjusted by controlling the length L of the loop 412.

A fourth advantage of the present invention is that high dopant concentrations can be used in a thermal Sagnac switch 400. High concentrations in silica-based glasses generally result in the formation of clusters, in which many dopant particles (e.g., ions) are adjacent instead of being evenly disseminated in the glass matrix. Unlike isolated ions, clustered ions are subject to cross-relaxation. Energy between clustered ions is exchanged, resulting in a loss of electronic population change via nonradiative mechanisms. This effect is detrimental to the nonlinear effect, because the nonlinear effect relies on the creation of a large population change with as little pump power as possible. Clusters increase the peak power required to obtain a certain level of population change, and thus decrease the nonlinear effect contribution. Similarly, clusters add nonradiative processes, i.e., increase the percentage of absorbed power turned into heat, which can be used to generate a thermal phase change. To be useful, the nonradiative time constant in clusters must be very short, which is generally true. (See, M. K. Davis, et al., Characterization of Clusters in Rare Earth-Doped Fibers by Transmission Measurements, *JOURNAL OF LIGHTWAVE TECHNOLOGY*, Vol. 13, No. 2, February 1995, pp. 120–126.) Thus, a thermal Sagnac switch 400 in accordance with the present invention can utilize a heavily doped active fiber 416, with the benefit that the fiber 416 can now be shorter. Therefore, the loop length L can be shorter, and the duration of the time during which the switch is on can be shorter.

A fifth advantage of the present invention is that unlike other interferometers, the Sagnac switch 400 does not require a short nonlinear fiber 416. So far, the field of resonant nonlinearity has been limited by the fact that fibers cannot be heavily doped because most dopants are poorly soluble in silica-based glasses. Thus, long fibers (on the order of 1 meter) are needed and the switches (e.g., Mach-Zehnder switches) are environmentally unstable. In the Sagnac switch 400 in accordance with the present invention, this restriction is completely removed, and many dopants that are not practical in other interferometers can be used in the Sagnac switch 400.

A sixth advantage of the present invention is that the switch operation depends very little to not at all on the pump polarization. When the thermal effect is used, for most dopants, absorption of the pump photons and conversion of the pump photons into heat occurs with the same efficiency and speed for any polarization of the pump light. This is highly advantageous, because in a fiber the state of polarization of the pump varies with environmental parameters, and, in particular, varies with temperature and pressure. In a Kerr-based fiber switch, unless, for example, a polarization-maintaining fiber is used to form the loop or an unpolarized pump is used, the switching power needed to induce switching depends on external temperature, pressure, etc. In the present invention, when the nonlinear effect is used, the pump-induced phase shift does depend on the relative polarization of the pump and the signal in the active fiber 416; however, the dependency is small, so that the switching power will depend very little on the pump polarization. (See, R. W. Keys, et al., Polarization-Dependent Gain in Erbium-Doped Fibers, *PROCEEDINGS OF THE OPTICAL FIBER COMMUNICATION CONFERENCE, OSA TECHNICAL DIGEST SERIES NO.* 4, 1994, pp. 306–307.)

A first embodiment of the present invention for the thermal Sagnac switch 400 utilizes an active fiber 416 doped with triply ionized samarium ($Sm^{3+}$). This dopant presents a very broad absorption band above approximately 1.1 micron that is very strongly nonradiative. It is thus predicted that nearly 100% of the pump power absorbed in this band is turned into heat, with a time constant in the nanosecond range, which means a fast rise time for the thermal index change. As explained above, large concentrations (i.e., short fibers) are likely possible with such dopants. The pump source 420 is advantageously a laser diode at 1.48 microns, or an approximately 1.55 -micron or 1.3-micron fiber or semiconductor laser. The signal must be in a transparency region of the dopant, which, for samarium, is advantageously in the 0.55–1.0 micron or 1.6–2 micron windows (approximately). The active fiber 416 advantageously comprises a few tens of centimeters (e.g., 20 centimeters) of fiber containing a few thousand mole parts per million (ppm) (e.g., 5,000 mole ppm) of $Sm^{3+}$. The loop 412 has a total length L on the order of 1 meter or even less, depending on the fall time required.

Other triply ionized rare earths can also be used for thermal switching. In particular, terbium ($Tb^{3+}$) or praseodymium ($Pr^{3+}$) can be used. $Tb^{3+}$ can be pumped at 1.6 microns with an Er-doped fiber laser, and will switch signals in a range between 700 nanometers and 1400 nanometers. $Pr^{3+}$ can be pumped at 1.48 microns with a laser diode, and will switch signals in a range of 650 nanometers to 1200 nanometers.

A second embodiment for a thermal Sagnac switch 400 utilizes an active fiber 416 doped with a transition metal such as doubly ionized cobalt ($Co^{2+}$), which presents a strong and wide absorption centered around approximately 0.7 micron that is strongly nonradiative. Measurements indicate that approximately 30–40% of the absorbed pump power is turned into heat, with a response time of 10 nanoseconds or less. $Co^{2+}$ absorbs strongly, and large concentrations of $Co^{2+}$ are possible in silica-based glasses. For example, full absorption around 700 nanometers at high powers has been demonstrated in a 2-millimeter fiber doped with an approximately 10,600 weight ppm of $Co^{2+}$. The pump is advantageously in the 700 nm range, and the signal is advantageously in the relatively narrow transparency window of $Co^{2+}$-doped silica around 830 nanometers. The active fiber 416 can be a few millimeters of fiber containing a few thousand weight ppm of $Co^{2+}$. The loop must be of the order of a few meters so that $\tau_L$ exceeds the rise time (a few nanoseconds, depending on pump pulse width) of the thermal index change.

Other transition metals are possible. In particular, triply to quintuply ionized vanadium ($V^{n+}$) ions in silica-based glasses absorb strongly and broadly in the 900 nm region. In particular, one exemplary fiber turned approximately 55% of the pump into heat. Ionized vanadium can be doped in silica with a sufficiently high concentration to enable use of millimeter length fibers. The absorption of ionized vanadium generally decreases with increasing wavelength, and is low above approximately 1.5 microns. Thus, a Sagnac switch 400 with an active fiber 416 doped with ionized vanadium can make a good switch in the 1.5-micron communication window. The composition of the fiber core and/or the valence of the vanadium may be advantageously adjusted, if necessary, to reduce the residual vanadium absorption in this region.

A third embodiment is a Sagnac switch 400 utilizing an active fiber 416 doped with a dopant which exhibits a strong and fast nonlinear response time (e.g., under a few tens of microseconds). Such dopants have not yet been identified, but potential candidates include divalent rare earths, such as, for example, divalent thulium ($Tm^{2+}$), and color centers. A first preferred requirement for such a dopant is that its nonlinearity should be relatively fast, which requires that it exhibits a purely radiative transition with a relatively high oscillator strength so that it does not exhibit nonradiative processes and its radiative lifetime is in the range of tens of microseconds or less. For example, if the dopant has a nonlinearity fall time of 10 nanoseconds, the loop length L must be shorter than 2 meters.

A second preferred requirement of the third embodiment is that the dopant can be pumped with a laser diode as the pump source 420 so that the Sagnac switch 400 can be compact. With current laser diode technology, an infrared transition is preferable, although shorter wavelength laser diodes with suitably high powers are starting to appear commercially.

A third preferred requirement of the third embodiment is the absence of nonradiative processes, which would otherwise induce an undesirable thermal phase change.

A fourth preferred requirement of the third embodiment is that the nonlinear fiber 416 be not too long, i.e., that the transition has a high oscillator strength and that the dopant concentration is high enough. This requirement guarantees a shorter loop, thus providing a shorter on time. Again, length is not as critical because a few meters of nonlinear fiber 416 would still yield a switch fall time in the few tens of nanoseconds range, which is adequate for many applications. However, to reap the full benefit from the nonlinearity of the fiber 416, which can have a fall time as fast as a few nanoseconds (e.g., approximately 5 nanoseconds), a loop length of only 1 meter is desired, and preferably, the active fiber 416 should be much shorter than 1 meter.

A fourth embodiment utilizes an active fiber which exhibits a relatively slow nonlinear dopant that is pumped with a sufficiently high peak power that the rise time $\tau_{rise}$ is sufficiently short for a practical loop length. For example, neodymium ($Nd^{3+}$) has a radiative lifetime of about 400 microseconds and has little thermal effect when pumped around 800 nanometers. A fiber doped with neodymium can be pumped with pump pulses having a duration of approximately 4 microseconds and having a peak power of 500 milliwatts so that the rise time is reduced to approximately 4 microseconds. The minimum loop length in such an embodiment is about 1,600 meters.

It should be understood that other glasses than silica-based glasses can be used in combination with the present invention. For example, fluorozirconate glasses, phosphate glasses, chalcogenides, tellurites, borates, and the like, may be used. In addition, the present invention may be combined with other waveguides, such as, for example, integrated optics waveguides.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. An apparatus for providing all optical switching of an optical signal comprising:

an input waveguide which receives an input optical signal;

a loop of optical waveguide, said loop of optical waveguide having an active portion located at an asymmetric position in said loop;

a coupler which couples light from said input waveguide to said loop to cause said optical signal to propagate in said loop as first and second counterpropagating signals and which couples said first and second counterpropagating in said loop as a combined output signal, said coupler having first and second output ports, said coupler coupling said combined output signal to said first output port when said first and second counterpropagating signals coupled from said loop have a first phase relationship, said coupler coupling said combined output signal to said second output port when said first and second counterpropagating signals coupled from said loop have a second phase relationship; and a source of pump light coupled to said loop to introduce pump light to said active portion of said loop, said active portion of said loop responsive to said pump light to cause respective first and second phase changes in said first and second counterpropagating signals, the location of said active portion at said asymmetric position causing said first counterpropagating signal to propagate from said active portion to said coupler with said first phase change before said second counterpropagating signal propagates from said active portion to said coupler with said second phase change, said first and second phase changes causing said first and second propagating optical signals coupled from said loop to switch from said first phase relationship to said second phase relationship for a time duration that starts when said first counterpropagating signal reaches said coupler with said first phase change and that ends when said second counterpropagating signal reaches said coupler with said second phase change, after which said first and second counterpropagating optical signals coupled from said loop return to said first phase relationship.

2. The apparatus as defined in claim 1, wherein said active portion comprises a waveguide doped with a dopant, said active portion having a first refractive index in the absence of pump light and being responsive to pump light to have a second refractive index different from said first refractive index.

3. The apparatus as defined in claim 2, wherein said refractive index of said active portion changes from said first refractive index to said second refractive index at a first rate of change when said pump light is applied and changes from said second refractive index to said first refractive index at a second rate of change when said pump light is removed, said first rate of change being faster than said second rate of change.

4. The apparatus as defined in claim 2, wherein said first and second counterpropagating optical signals propagate through said loop in a loop transit time, and wherein said refractive index changes from said first refractive index to said second refractive index in a rise time, said rise time being much shorter than said loop transit time.

5. The apparatus as defined in claim 2, wherein said first and second counterpropagating optical signals propagate through said loop in a loop transit time, and wherein said refractive index changes from said second refractive index to said first refractive index in a fall time, said fall time being much greater than said loop transit time.

6. The apparatus as defined in claim 1, wherein said first and second counterpropagating optical signals coupled from said loop have said second phase relationship for a time duration approximately equal to a transit time of said first counterpropagating optical signal through an inactive portion of said loop of optical waveguide.

7. The apparatus as defined in claim 1, wherein said first and second counterpropagating optical signals switch from said second phase relationship to said first phase relationship even if said pump light has a duration greater than said time duration proportional to said propagation time through said loop.

8. The apparatus as defined in claim 1, wherein said phase changes in said first and second counterpropagating optical signals are caused by thermal changes in said active portion of said optical waveguide in response to said pump light.

9. The apparatus as defined in claim 8, wherein said active portion of said optical waveguide comprises glass doped with an ionized rare earth.

10. The apparatus as defined in claim 9, wherein said rare earth comprises terbium.

11. The apparatus as defined in claim 9, wherein said rare earth comprises praseodymium.

12. The apparatus as defined in claim 9, wherein said rare earth comprises samarium.

13. The apparatus as defined in claim 9, wherein said glass comprises silica.

14. The apparatus as defined in claim 8, wherein said active portion of said optical waveguide comprises glass doped with a transition metal.

15. The apparatus as defined in claim 14, wherein said transition metal comprises ionized cobalt.

16. The apparatus as defined in claim 14, wherein said transition metal comprises ionized vanadium.

17. The apparatus as defined in claim 14, wherein said glass comprises silica.

18. The apparatus as defined in claim 1, wherein said phase changes in said first and second counterpropagating optical signals are caused by a nonlinear effect in said active portion of said optical waveguide in response to said pump light.

19. The apparatus as defined in claim 18, wherein said active portion of said optical waveguide comprises glass doped with a dopant having a strong nonlinear response and a fast nonlinear response time.

20. The apparatus as defined in claim 19, wherein said dopant comprises a divalent rare earth.

21. The apparatus as defined in claim 20, wherein said divalent rare earth comprises thulium.

22. The apparatus as defined in claim 19, wherein said glass comprises silica.

23. The apparatus as defined in claim 18, wherein said active portion of said optical waveguide comprises glass doped with neodymium.

24. The apparatus as defined in claim 23, wherein said glass comprises silica.

25. The apparatus as defined in claim 18, wherein said pump light is generated by a laser diode.

26. The apparatus as defined in claim 18, wherein said nonlinear effect occurs in the absence of radiative processes.

27. The apparatus as defined in claim 18, wherein said active portion is doped with a dopant of sufficient concentration that said active portion has a length of less than one meter.

28. The apparatus as defined in claim 1, wherein said active portion of said waveguide has a length less than approximately one-half an overall length of said loop of optical waveguide.

29. The apparatus as defined in claim 1, wherein said first and second counterpropagating optical signals switch from said first phase relationship to said second phase relationship independently of a polarization of said first and second signals.

* * * * *